US012052605B2

(12) United States Patent
Faronius et al.

(10) Patent No.: US 12,052,605 B2
(45) Date of Patent: Jul. 30, 2024

(54) METHOD AND APPARATUS FOR MULTI-CONNECTION FLOW CONTROL IN A WIRELESS COMMUNICATION NETWORK

(71) Applicant: Telefonaktiebolaget LM Ericsson (publ), Stockholm (SE)

(72) Inventors: Carola Faronius, Järfälla (SE); Mattias Åkervik, Kista (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 303 days.

(21) Appl. No.: 17/767,236

(22) PCT Filed: Oct. 11, 2019

(86) PCT No.: PCT/SE2019/050994
§ 371 (c)(1),
(2) Date: Apr. 7, 2022

(87) PCT Pub. No.: WO2021/071401
PCT Pub. Date: Apr. 15, 2021

(65) Prior Publication Data
US 2022/0377611 A1    Nov. 24, 2022

(51) Int. Cl.
*H04W 28/082* (2023.01)
*H04L 45/24* (2022.01)
(Continued)

(52) U.S. Cl.
CPC ......... *H04W 28/082* (2023.05); *H04L 45/245* (2013.01); *H04W 28/0205* (2013.01); *H04W 76/15* (2018.02)

(58) Field of Classification Search
CPC ........... H04W 28/082; H04W 28/0861; H04W 76/15; H04L 45/245; H04L 5/006; H04L 5/0044
See application file for complete search history.

(56) References Cited

U.S. PATENT DOCUMENTS

| 8,780,938 B2 * | 7/2014 | Lerzer | H04W 80/02 370/473 |
| 9,655,090 B2 * | 5/2017 | Pani | H04W 28/06 |
| 2018/0279168 A1 * | 9/2018 | Jheng | H04L 5/001 |

(Continued)

FOREIGN PATENT DOCUMENTS

| EP | 3399724 B1 * | 10/2022 | H04B 7/0413 |
| EP | 3738249 B1 * | 3/2023 | H04L 1/00 |

OTHER PUBLICATIONS

CMCC: "Enhancement of RLC status report over air interface for DC-based PDCP duplication", 3GPP Draft R2-1909446, Aug. 26-30, 2019.*

(Continued)

*Primary Examiner* — Redentor Pasia
(74) *Attorney, Agent, or Firm* — Rothwell, Figg, Ernst & Manbeck, P.C.

(57) ABSTRACT

With multiple connections (20) communicatively coupling a User Equipment (UE) (12) to a wireless communication network (10), methods and apparatuses disclosed for performing flow control at the Radio Link Control (RLC) level advantageously control the shares of overall data conveyed on the respective connections (20) in a manner that accounts for changing conditions on the involved radio links (22) while accommodating signaling delays and other complexities that arise from distributed or virtualized implementations of the underlying processing apparatuses (18). The disclosed methods and apparatuses have applicability both to uplink multi-connectivity and downlink multi-connectivity, and apply to various multi-connectivity scenarios, including scenarios involving mixed Radio Access Technologies (RATs) and Carrier Aggregation (CA) configurations that aggregate two or more Component Carriers (CCs) for carrying user traffic between a UE (12) and the network (10).

22 Claims, 7 Drawing Sheets

(51) Int. Cl.
*H04W 28/02* (2009.01)
*H04W 76/15* (2018.01)

(56) References Cited

U.S. PATENT DOCUMENTS

| | | | |
|---|---|---|---|
| 2019/0327033 A1* | 10/2019 | Huang | H04L 1/16 |
| 2020/0028564 A1* | 1/2020 | Agiwal | H04W 12/033 |
| 2020/0068436 A1* | 2/2020 | Hsueh | H04W 28/065 |
| 2020/0235869 A1* | 7/2020 | Pradas | H04L 1/1867 |
| 2020/0275314 A1* | 8/2020 | Mattam | H04W 28/0975 |
| 2021/0028888 A1* | 1/2021 | Kim | H04L 1/08 |
| 2021/0266115 A1* | 8/2021 | Pradas | H04L 1/1896 |
| 2021/0337627 A1* | 10/2021 | Kim | H04W 28/04 |
| 2023/0023138 A1* | 1/2023 | Qu | H04W 80/02 |
| 2023/0077500 A1* | 3/2023 | Qu | H04W 72/20 |
| | | | 370/329 |
| 2023/0309179 A1* | 9/2023 | Ingale | H04W 36/0069 |

OTHER PUBLICATIONS

International Search Report and Written Opinion issued in International Application No. PCT/SE2019/050994, dated Jul. 1, 2020 (12 pages).

CMCC, "Enhancement of RLC status report over air interface for DC-based PDCP duplication", 3GPP TSG-RAN WG2 #107, R2-1909446, Prague, Czech Republic, Aug. 2019 (3 pages).

LG Electronics Inc. et al., "Handling of RLC stuck problem with PDCP duplication", 3GPP TSG-RAN WG2 #107bis, R2-1913805, Chongqing, China, Oct. 2019 (2 pages).

Nokia et al., 3GPP TSG-RAN WG2 Meeting #105bis, R2-1904075, Xi'an, China, Apr. 2019 (6 pages).

Ericsson, "104_40NR_IIOT PDCP duplication report of email discussion, TP", 33GPP TSG-RAN WG2 #105, R2-1902362, Athens, Greece, Mar. 2019 (29 pages).

* cited by examiner

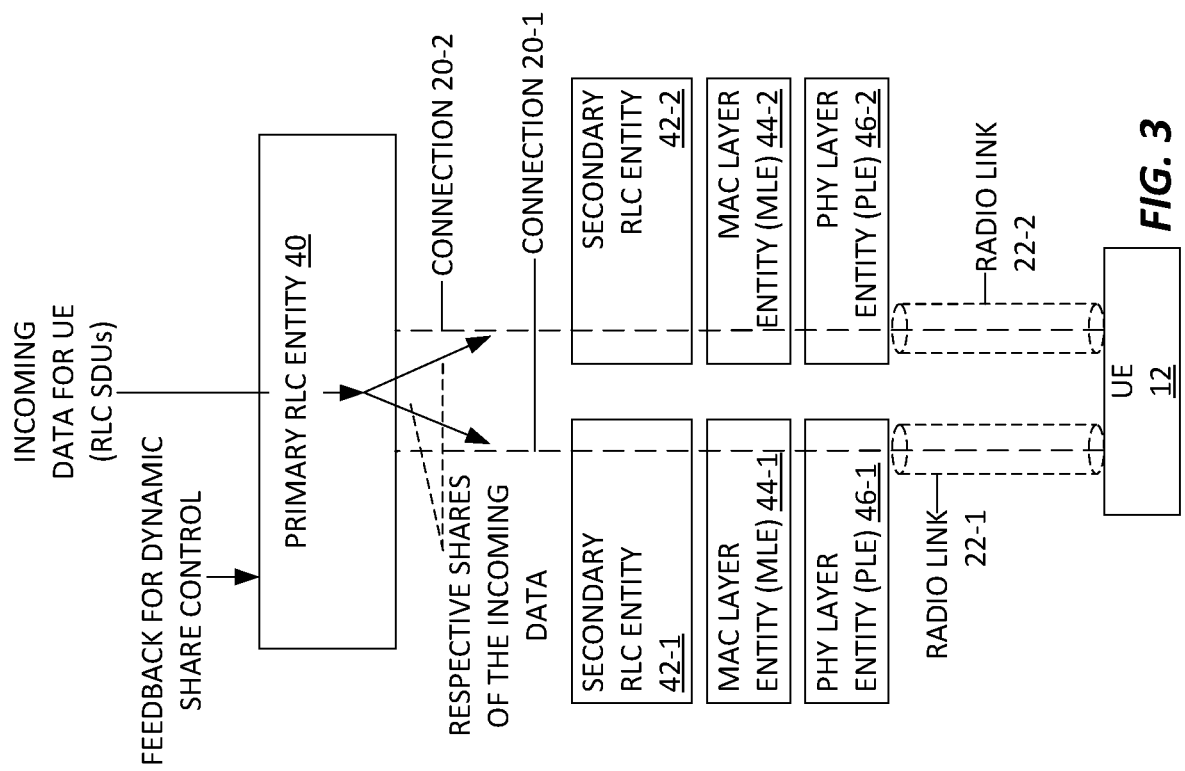

METHOD AND APPARATUS FOR MULTI-CONNECTION FLOW CONTROL IN A WIRELESS COMMUNICATION NETWORK

CROSS REFERENCE TO RELATED APPLICATION(S)

This application is a 35 U.S.C. § 371 National Stage of International Patent Application No. PCT/SE2019/050994, filed Oct. 11, 2019.

TECHNICAL FIELD

The present invention relates to wireless communication networks, and particularly relates to techniques for multi-connection flow control in wireless communication networks.

BACKGROUND

In many or most implementations of wireless communication networks, the communications between a supporting radio network node in a Radio Access Network (RAN) and a User Equipment (UE) involve processing of data and related control information at respective "layers" of a protocol stack. The radio network node and the UE implement corresponding stacks, with corresponding protocol layers "mirrored" between the two stacks, such that the processing entity at a given protocol layer in the stack implemented at the UE is a "peer" to the processing entity at the same layer in the stack implemented by radio network node, such as an "eNB" in a Long Term Evolution (LTE) network or a "gNB" in a Fifth Generation/New Radio (5G NR) network, as defined by the controlling specifications promulgated by the Third Generation Partnership Project, commonly referred to as the 3GPP.

FIG. 1 depicts example radio protocol stacks respectively implemented in a radio network node (RNN) of a RAN and a UE, for managing radio communications between the RNN and the UE. The depicted example stacks include a Packet Data Convergence Protocol (PDCP) layer, a Radio Link Control Layer (RLC), a Medium Access Control (MAC) layer, and a Physical (PHY) layer, with each layer in each stack having a corresponding protocol processing entity and operating as a peer with respect to the corresponding entity in the other stack. For significant example details regarding the different layers and their respective functions, see 3GPP TS 36.300 V15.6.0 (2019 June), and note that various references sometimes use the term "sublayer" to refer to one or more of the "layers" depicted in FIG. 1.

Additional example details for the individual layers (or sublayers) are seen in the following documents: 3GPP TS 36.321 V15.6.0 (2019 June) for the MAC layer, 3GPP TS 36.322 V15.2.0 (2019 June) for the RLC layer, and 3GPP TS 36.323 V15.4.0 (2019 June) for the PDCP layer. While the foregoing documents relate to 4G networks, the 3GPP has released corresponding technical specifications for 5G NR. See 3GPP TS 38.321 V15.6.0 (2019 June) for the MAC layer, 3GPP TS 38.322 V15.5.0 (2019 April) for the RLC layer, and 3GPP TS 38.323 V15.6.0 (2019 June) for the PDCP layer. Also, see 3GPP TS 38.401 V15.6.0 (2019 July) for overall architectural details of interest for 5G/NR networks.

Of course, the applicability of the methods and apparatuses disclosed herein are not limited to these specific specifications or specification versions, or to the involved Radio Access Technologies (RATs) and network "generations". However, the cited specifications provide representative examples, offering a good basis for understanding the general role play by each of the protocol layers.

Of particular interest, the RLC layer (or sublayer) manages the transfer of user data and signaling between the upper layers of the stack and the MAC layer. In this role, the PDCP layer provides RLC Service Data Units (SDUs) to the RLC layer, which are then formed into RLC Protocol Data Units (PDUs), based on concatenation and segmentation of the RLC SDUs, along with the addition of corresponding header information. The particular operations carried out by the RLC layer may be "modal" and depend on the RLC mode being used. Known modes are "Transparent Mode", "Acknowledged Mode", and "Unacknowledged Mode". In the Acknowledged Mode (AM) of operation, the receiving RLC entity, either in the RNN or the UE, provides return indications of received and missing RLC PDUs, as identified by Sequence Numbers (SN) assigned at the transmitting RLC entity, as part of providing in-sequence delivery, error detection, and duplicate detection. In the Unacknowledged Mode (UM), the transmitting RLC entity also includes SNs in the RLC PDU headers but the receiving RLC entity does not return acknowledgement signaling.

At least some of the stack processing may be carried out remotely from the radio link used at the PHY layer. For example, the RNN may be "divided" into a BaseBand Unit (BBU) or Digital Radio Unit (DRU) and one or more Remote Radio Units (RRUs). Although the precise functionality split between the BBU and the RRUs may vary depending upon the network standards involved and the features implemented—such as whether beamforming is used—at least some of the involved processing occurs in the digital domain in the BBU, with high-speed, precisely-timed links carrying outgoing signals in the digital domain to a targeted RRU, for conversion to the analog domain and downlink (DL) transmission. Likewise, the RRU converts incoming antenna-received signals received in the uplink (UL) direction, for transport to the BBU.

Similar examples appear in the context of Distributed Antenna Systems and other arrangements in which at least some of the processing of the radio protocol stack is physically remote from the RNN providing the radio link. In all such contexts, the economies of scale associated with centralized data processing, such as "cloud computing" or "data center computing" make attractive the implementation of at least part of the radio protocol stack using virtualized processing circuitry. Virtualization or, more generally, distributed-computing implementations of the protocol stack processing, bring a host of challenges.

For example, a wireless communication network operator may, as a practical matter, be forced to use Commercial-Off-The-Shelf (COTS) processing hardware for implementation of BBUs or other parts of its network. For example, the operator may lease space in a third-party data center that has "standard" commercially-available, general-purpose servers or blade computing systems that are used to virtualize parts of the operator's network, such as virtual BBUs (vBBUs).

While the processing cores implemented in the type of servers used in commercial data centers offer impressive performance, it is recognized herein that the processing performance of such cores may exceed their input/output (I/O) performance by a significant margin. Flowing from that performance discrepancy is the further recognition that the I/O delays between separate processing apparatuses creates significant complications for carrying out interrelated protocol processing on separate processing apparatus. Here, a "separate" processing apparatus connotes any physically separate processing cores or microprocessor circuits that are interconnected via interfaces external to the involved cores or microprocessors. Separate servers or blades, or even separate processing subsystems interconnected by on-card or backplane interconnects are representative examples. More extreme examples include processing circuitry at different geographic locations—e.g., processing circuitry at two different RNNs involved in providing multi-connectivity between the network and a UE.

SUMMARY

With multiple connections communicatively coupling a User Equipment (UE) to a wireless communication network, methods and apparatuses disclosed for performing flow control at the Radio Link Control (RLC) level advantageously control the shares of overall data conveyed on the respective connections in a manner that accounts for changing conditions on the involved radio links while accommodating signaling delays and other complexities that arise from distributed or virtualized implementations of the underlying processing apparatuses. The disclosed methods and apparatuses have applicability both to uplink multi-connectivity and downlink multi-connectivity, and apply to various multi-connectivity scenarios, including scenarios involving mixed Radio Access Technologies (RATs) and Carrier Aggregation (CA) configurations that aggregate two or more Component Carriers (CCs) for carrying user traffic between a UE and the network.

One aspect of the disclosed flow control involves the use of two levels of RLC processing. In one implementation, a first level of RLC processing forms RLC Protocol Data Units (PDUs) from RLC Service Data Units (SDUs) incoming to the first level of RLC processing, and controls the share of the RLC PDUs provided for transmission on each of two or more connections, based on one or more types of feedback relating to transmission conditions on the respective connections. Correspondingly, a second level of RLC processing operates for each connection, providing segmentation processing as needed, for the RLC PDUs to be transmitted over the radio link(s) included in the connection. The first level of RLC processing may track the RLC Sequence Numbers (SNs) for the respective shares of user data provided to each connection, for managing RLC-layer retransmissions.

Further, in at least one embodiment, the feedback relating to throughputs on the respective connections drives the dynamic share determinations and the "share" of data provided to each connection may be, for example, proportional to the comparative throughput of the connection. However, the "share" may go to zero for a given connection, which can be understood as a deactivation of the connection. Moreover, in one or more embodiments, the control interval, also referred to as a "scheduling interval," for deciding the per-connection shares accounts for signaling delays arising between Medium Access Control (MAC) entities, when the MAC entities managing the involved radio links are implemented in separate processing apparatuses.

In one example, a primary RLC entity operates at an RLC protocol layer in a wireless communication network, the primary RLC entity being implemented by a processing apparatus and performing a method that includes receiving RLC SDUs incoming from a Packet Data Convergence Protocol PDCP entity operating at a PDCP protocol layer in the wireless communication network. The RLC SDUs carry user traffic for a User Equipment (UE), and the method includes the primary RLC entity providing respective shares of the RLC PDUs formed from the RLC SDUs to two or more Downlink (DL) connections that communicatively couple the wireless communication network to the UE. Each DL connection includes one or more radio links and has an associated secondary RLC entity that provides RLC PDU segmentation, as needed, for RLC PDU transmissions on the one or more radio links. As part of carrying out the example method, the primary RLC entity dynamically determines the respective shares in dependence on feedback received at the primary RLC entity for the two or more DL connections, the feedback relating to throughputs of the two or more DL connections.

In a related example, a processing apparatus includes interface circuitry configured to receive RLC SDUs incoming from a PDCP entity operating at a PDCP protocol layer in a wireless communication network, with the RLC SDUs carrying user traffic for a UE. Further included in the processing apparatus is processing circuitry that is operatively associated with the interface circuitry.

The processing circuitry is configured to implement a primary RLC entity operating at an RLC protocol layer in the wireless communication network, with the primary RLC entity configured to perform flow control for the RLC SDUs. To perform such flow control, the processing circuitry operating as the primary RLC entity is configured to provide respective shares of the RLC PDUs formed by it from the RLC SDUs to two or more DL connections that communicatively couple the wireless communication network to the UE. Each DL connection includes one or more radio links and has an associated secondary RLC entity that provides segmentation, as needed, for RLC PDU transmissions on the included radio link(s). Correspondingly, the processing circuitry is configured to dynamically determine the respective shares in dependence on feedback received at the primary RLC entity for the two or more DL connections, the feedback relating to throughputs of the two or more DL connections.

Of further note, in at least one embodiment, the primary RLC entity tracks/stores the RLC PDUs and SNs provided to the respective connections. The primary RLC entity uses the tracked/stored information to handle RLC-layer retransmission.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3 is a block diagram of an example embodiment of primary and secondary Radio Link Control (RLC) entities, configured for RLC flow control.

DETAILED DESCRIPTION

Figure 2:
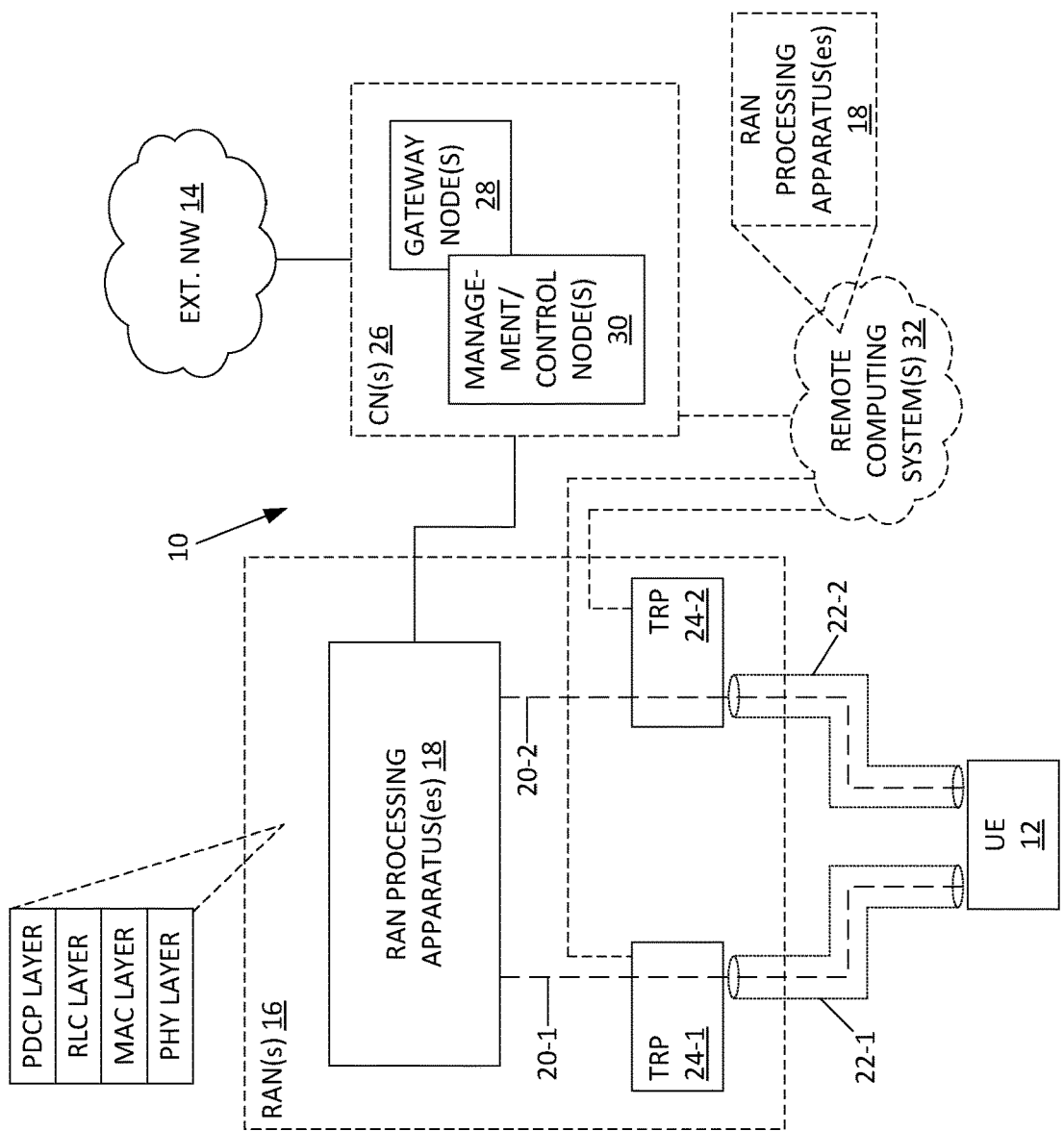
FIG. 2 is a block diagram of an example embodiment of a wireless communication network, depicted with communicative coupling to a UE via two or more connections.
Figure 1:
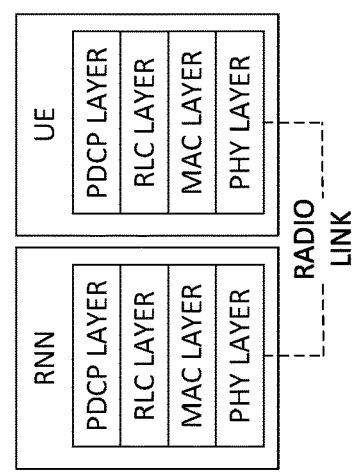
FIG. 1 is a block diagram of known implementations of peer radio protocol stacks respectively used in a Radio Network Node (RNN) of a wireless communication network and a User Equipment (UE) communicatively coupled to the network.

FIG. 2 depicts a wireless communication network 10 (network 10) according to an example embodiment. Communicative coupling provided by the network 10 to a User Equipment (UE) 12 allows the UE 12 to communicate with other UEs operating in the network 10 and/or with devices or systems accessible through one or more external networks 14, such as the Internet. As a non-limiting example, the network 10 operates according to specifications promulgated by the 3GPP, e.g., as an LTE network or a NR/5G network.

Indeed, although depicted as a single network, the network 10 may be a composite of two or more networks, or at least include more than one Radio Access Technology (RAT), such as both 4G (LTE) and 5G/NR RATs. As such, the network 10 includes one or more Radio Access Networks (RANs) 16 with one or more RAN processing apparatuses 18 providing related radio protocol stack processing—e.g., implementing certain protocol entities of the radio protocol stack(s) used to support communications between the network 10 and the UE 12.

Regardless of its implementation details, the network 10 provides "multi-connectivity" with the UE 12, where "multi-connectivity" denotes serving the UE 12 via two or more "connections" with coordination therebetween. Multi-connectivity applies to the downlink (DL) or to the Uplink (UL), or to both the DL and the UL between the network 10 and the UE 12. Although examples herein focus on DL scenarios, the methods and apparatuses disclosed are also applicable to the UL direction. In either case, a "connection" shall be understood as including both logical and physical components, e.g., the internal connection setups and associated logical control within the network 10 for providing service to the UE 12, along with the involved physical radio links—the air interface connections. In this regard, each such "connection" includes or otherwise maps to at least one radio bearer.

Multi-connectivity scenarios include "Carrier Aggregation" scenarios, where the network 10 configures two or more "Component Carriers" on the DL and/or the UL, for serving the UE 12. See the 36.714 series of Technical Releases (TRs) by the 3GPP, e.g., TR 36.714-00-00 V14.0.0 (2017 June), which set out details related to various CA configurations in Evolved Universal Terrestrial Radio Access (E-UTRA) context. For 4G (LTE) embodiments of the network 10, the RAN(s) 16 are E-UTRA-based RANs. Other non-limiting examples of multi-connectivity include so-called "Dual Connectivity" (DC) scenarios, such as where the UE 12 has connections spanning two or more Radio Network Nodes (RNNs). In one example, the UE 12 has two 4G connections, and in another example, the UE 12 has one 4G connection and one 5G connection. This latter example may be referred to as EN-DC, denoting connections to an E-UTRA RAN (4G) and to a New Radio (NR) RAN (5G).

The depicted RAN(s) 16 include one or more RAN processing apparatuses 18, which provide at least some of the digital domain processing for implementation of the radio protocol stack(s) used for communicating with the UE 12 over multiple connections, with two connections 20-1 and 20-2 shown. When suffixes are not needed for clarity, this disclosure uses the reference number "20" without suffixing, to refer to any given connection or connections. The same applies for other suffixed reference numbers used in the drawings.

Each connection 20 includes one or more radio links. In the diagram, the connection 20-1 includes a radio link 22-1 and the connection 20-2 includes a radio link 22-2. A Transmission/Reception Point (TRP) 24-1 anchors the radio link 22-1 in the network 10, while a TRP 24-2 anchors the radio link 22-2. The term "TRP" has broad meaning and covers essentially any type of RNN that provides physical-layer (radio) connectivity with the UE 12. Examples in a 4G scenario include "eNBs" and "gNBs" in a 5G scenario. Both eNBs and gNBs are types of radio base stations. In other examples, the TRPs 24 are Remote Radio Units (RRUs) having high-speed connections to the RAN processing apparatus(es) 18, which operate as one or more BaseBand Units (BBUs) with respect to the RRUs.

The network 10 further includes one or more Core Networks (CNs) 26, which provide data-routing and address-handling functions for coupling the UE 12 to the external network(s) 14, as represented by the depicted gateway node(s) 28. The CN(s) 26 also provide various authentication, security, and mobility management functions for the UE 12, as represented by the management/control node(s) 30. Further, in at least one embodiment, the network 10 is associated with one or more remote computing systems 32, which may be used for implementation of at least some of the functionality represented by the one or more RAN processing apparatuses 18.

A challenge associated with multi-connectivity stems from the fact that the radio protocol stack(s) used in the network 10 for supporting communications with the UE 12 necessarily are "branched" or otherwise replicated at least at the lowest levels. For example, the respective physical layers represented by the radio links 22-1 and 22-2 are at separate TRPs 24, and the corresponding MAC-layer processing also may be split, such that a first MAC-layer entity operates in the TRP 24-1 for the radio link 22-1 and a second MAC-layer entity operates in the TRP 24-2 for the radio link 22-2. The separation between the MAC entities imposes inter-entity communication delays that greatly complicate certain aspects of the upper-layer processing.

Among other things, the methods and apparatuses disclosed herein overcome the challenges associated with such communication delays and with other complications later described. Referring to an example arrangement shown in FIG. 3, one aspect of the contemplated methods and apparatuses involves the use of a "primary" RLC entity 40, along with secondary RLC entities 42 for each connection 20.

In FIG. 3, the connection 20-1 includes the radio link 22-1 and the protocol stack for the connection 20-1 includes the primary RLC entity 40, a secondary RLC entity 42-1, a MAC-layer entity (MLE) 44-1, and a PHY layer entity (PLE) 46-1. Similarly, the protocol stack for the connection 20-2 includes the primary RLC entity 40, a secondary RLC entity 42-2, a MAC-layer entity (ILE) 44-2, and a PHY layer entity (PLE) 46-2. Here, the term "entity" refers to the per-layer functionality and the underlying circuitry implementing that functionality.

User data for transmission to a UE 12 flows into the primary RLC entity 40, which performs a type of flow control at the RLC layer, based on deciding the "share" of the incoming user data that is provided to each of the connections 20 being used to serve the UE 12. In the specific example of FIG. 3, there are two connections 20-1 and 20-2 and the primary RLC entity 40 receives incoming data for the UE 12 in the form of RLC SDUs and decides what share of that data is provided to each of the connections 20-1 and 20-2, based on receiving feedback relating to throughputs on the connections 20. Broadly, the primary RLC entity 40 may provide a larger share of the data to a connection 20 providing comparatively higher throughput, as compared to the share provided to a lower-throughput connection. The primary RLC entity 40 also may deactivate or otherwise starve a connection 20, by providing it with a zero share of the incoming data.

Figure 4A:
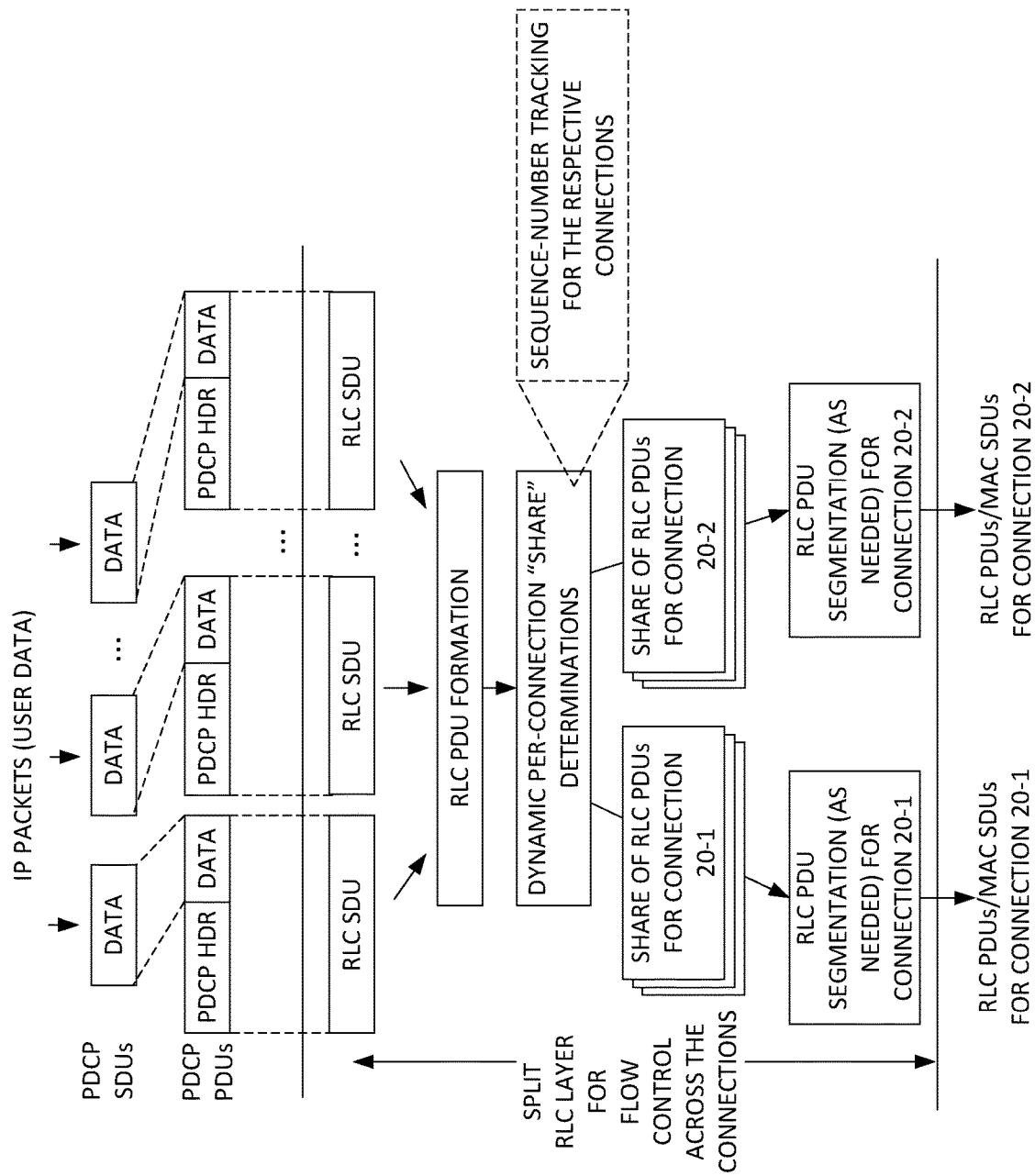
FIGS. 4A and 4B are block diagrams of example embodiments of the functional splitting or "share" allocations performed for RLC flow control across multiple connections with a UE.

FIG. 4A illustrates related functional operations in more detail, for an example embodiment. Internet Protocol (IP) packets comprising user traffic (data) represent Packet Data Convergence Protocol (PDCP) SDUs and flow into the PDCP layer from a higher layer in the overall protocol stack. Taking the DL direction as an example case where the stack processing flow is downward towards the physical layer for DL transmission to the UE 12, each intermediate layer in the protocol stack receives SDUs from the next layer above it, forms Protocol Data Units (PDUs) from the incoming SDUs, and passes the formed PDUs downward to the next layer below it. The next lower layer receives those PDUs as SDUs for PDU formation at that next lower layer. The same SDU/PDU relationships apply in the UL direction, with the data flow then being upward through the protocol stack.

As seen in FIG. 4A, the PDCP layer forms PDCP PDUs from the incoming PDCP SDUs, and passes the PDCP PDUs downward to the RLC layer, where they are processed as incoming RLC SDUs. The primary RLC entity 40 forms RLC PDUs from the incoming RLC SDUs, according to the decision on the share of user data to be provided for each connection 20. The RLC PDUs formed for each connection 20 may account for the transmission parameters in use for the radio link(s) 22 included in the connection 20, and the secondary RLC entity 42 that is associated with the connection 20 then provides RLC PDU segmentation, as needed, for RLC PDU transmissions on the included radio links 22.

This allocation of shares by the primary RLC entity operates as a form of flow control that is responsive to the changing radio conditions on the radio links 22 included in the connections 20. For example, the primary RLC entity 40 adjusts the shares on a recurring interval, which may be regarded as a scheduling interval. In one example, the primary RLC entity 40 receives feedback either once or at multiple instances during a given scheduling interval and uses the feedback to evaluate the connections 20 in terms of preference or weighting, e.g., where a higher-performing connection 20 is preferred over a lower-performing connection 20. The primary RLC entity 40 makes a corresponding adjustment of the shares and uses the decided shares during the next scheduling interval to control the allocation of incoming user data to the respective connections 20. Here, the share of the overall, incoming user data provided to each connection 20 may be provided in the form of RLC SDUs, or in the form of RLC PDUs. RLC PDUs differ from RLC SDUs in that they include RLC header information and may include RLC SDU segments, as the RLC PDU payload, rather than whole RLC SDUs.

Of course, other arrangements are possible, depending on the nature of the feedback. For example, the primary RLC entity 40 may receive feedback at the beginning of each recurring interval and make the sharing decision for that interval, based on the current feedback. Alternatively, the feedback may be "asynchronous" with the scheduling intervals, such as where the feedback comprises indications of signal conditions on the involved radio links 22 and/or Hybrid Automatic Repeat reQuest (HARQ) information or other retransmission information (such as retransmission statistics) for the involved radio links. Such information may be averaged or otherwise processed by the primary RLC entity 40 or by the entities providing it, and the primary RLC entity 40 would then make recurring sharing decisions based on the then-current value(s) of the feedback.

Figure 4B:
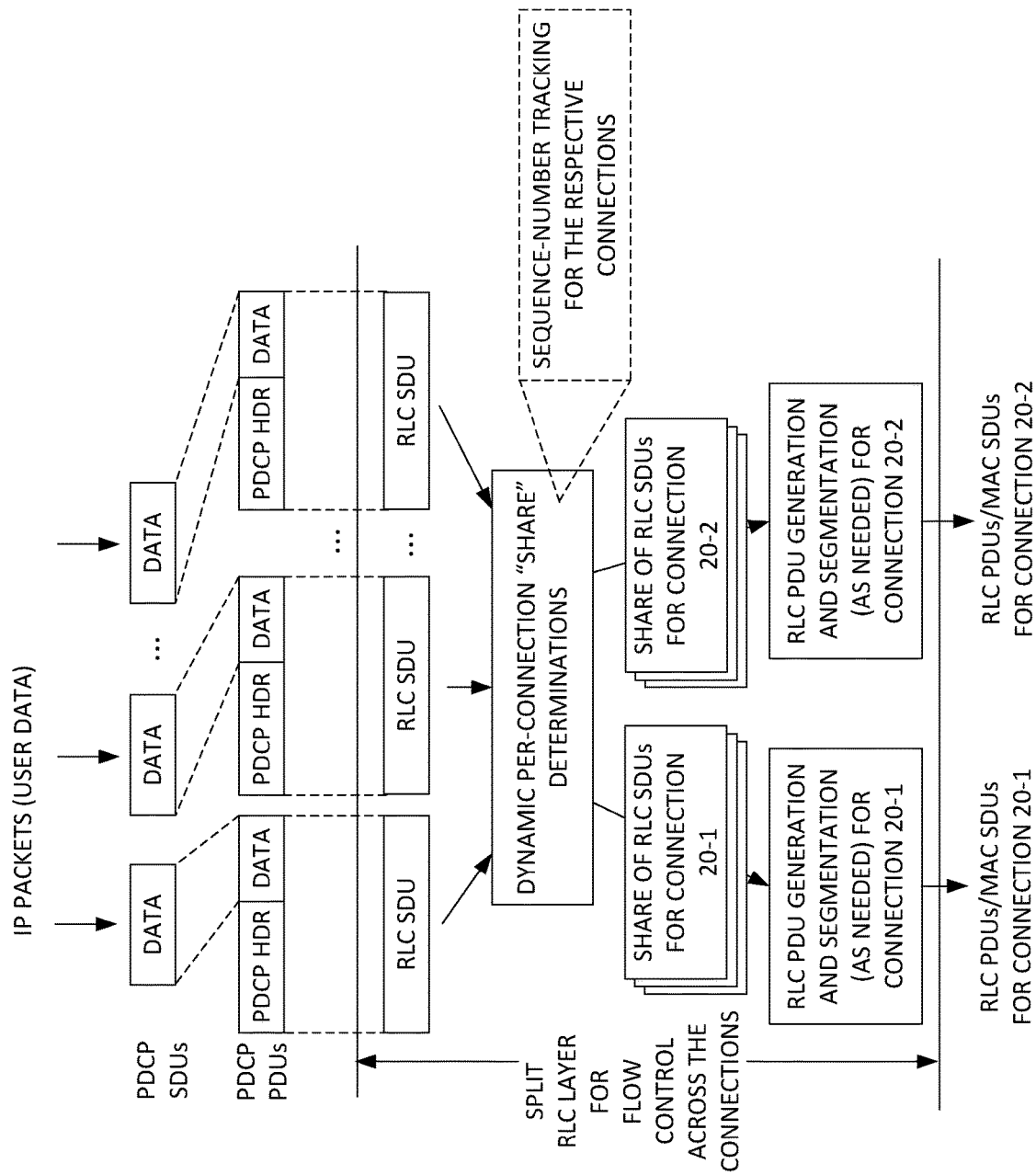

In any case, in the depicted "split" RLC layer, the primary RLC entity 40 provides the determined shares of the incoming data to the respective secondary RLC entities 42 associated with the connections 20. While FIG. 4A illustrates an example case where the respective data provided to each connection 20 is in the form of a respective share of the RLC PDUs formed by the primary RLC entity 40 from the incoming RLC SDUs, FIG. 4B illustrates another example embodiment, where the primary RLC entity 40 provides the respective shares of the incoming user data as RLC SDUs. For example, in a 5G NR scenario, each RLC SDU corresponds to an RLC PDU. In contrast, in an LTE-based scenario, multiple RLC SDUs may be combined into a single RLC PDU.

Also of note in FIGS. 4A and 4B, the primary RLC entity 40 keeps track of the RLC Sequence Numbers (SNs) associated with the user-data transmissions carried out on each of the connections 20. Tracking the RLC SNs associated with the share of user data provided to each connection 20 provides the primary RLC entity 40 with a mechanism for handling retransmissions carried out at the RLC layer, e.g., when operating in an RLC Acknowledged Mode (AM). While the SNs in a 5G NR case refer RLC SDUs or their corresponding RLC PDUs, given the one-to-one correspondence between RLC SDUs and RLC PDUs in 5G NR, the SNs in an LTE-based example refer to RLC PDUs, which may combine RLC SDUs.

Figure 5:
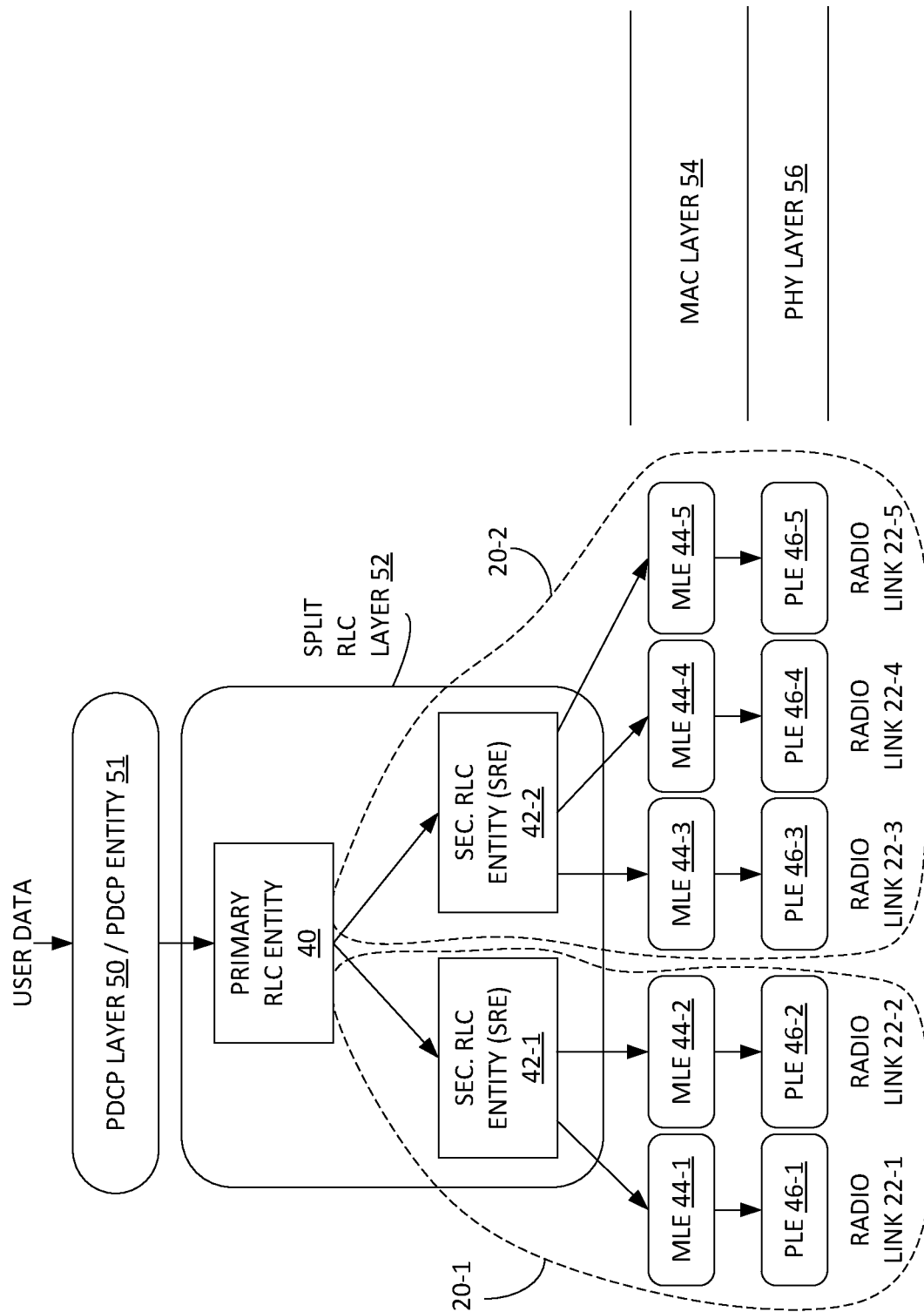
FIG. 5 is a block diagram of another example embodiment of primary and secondary RLC entities, for RLC flow control across multiple connections with a UE.

FIG. 5 provides another example illustration of the contemplated RLC-layer flow control, showing user data flowing into and down through a radio protocol stack used in the RAN(s) 16 of the network 10 for communicating with a UE 12. The stack includes a PDCP layer 50, a split RLC layer 52, a MAC layer 54, and a PHY layer 56. The primary RLC entity 40 and respective secondary RLC entities 42-1 and 42-2 operate at the split RLC layer 52, with the secondary RLC entity 42-1 providing RLC processing—PDU formation, etc.—for the connection 20-1 and the secondary RLC entity 42-2 providing RLC processing for the connection 20-2.

In this example, the connection 20-1 includes two radio links 22-1 and 22-2, and the connection 20-2 includes three radio links 22-3, 22-4, and 22-5. At the MAC layer 54, a MAC-layer entity (MLE) 44-1 and a PHY-layer entity (PLE) 46-1 perform MAC-layer and PHY-layer processing, respectively, for the radio link 22-1. Similar per-radio-link associations are seen for the MLEs 44-3 through 44-5 and the PLEs 46-3 through 46-5.

As a non-limiting scenario, the arrangement depicted in FIG. 5 represents a DL Carrier Aggregation (CA) configuration for the UE 12, where the network 10 uses five Component Carriers (CCs) to serve the UE, where each of the five radio links 22-1 through 22-5 corresponds to one of the CCs. As such, the connection 20-1 includes two radio links 22-1 and 22-2, and the secondary RLC entity 42-1 provides RLC segmentation processing for the respective radio links 22-1 and 22-2. The connection 20-2 includes three radio links 22-3, 22-4, and 22-5, and the secondary RLC entity 42-2 provides RLC processing and control for the respective radio links 22-3, 22-4, and 22-5.

In deciding what share of user data to provide to the connection 20-1 and what corresponding share to provide to the connection 20-2, the primary RLC entity 40 considers the performance of each connection 20, which ultimately depends on the number and type(s) of radio link(s) 22 included in the connection 20, and the specific transmission/reception conditions on the included radio link(s) 22. The share determinations may control carrier activation/deactivation within the CA configuration, e.g., allocating a zero share to a connection 20 triggers a deactivation of the radio links 22 included in that connection 20. Alternatively, the primary RLC entity 40 in one or more embodiments receives activation/deactivation information and adjusts its share decisions accordingly. For example, upon receiving an indication that the CC(s) included in a given connection 20 are being deactivated, the primary RLC entity 40 assigns that given connection a zero share, or otherwise removes it entirely from its share-deciding operations. In more detail, a certain CC may be flagged for deactivation, whereupon the MAC entity associated with the CC instructs the UE 12 to deactivate the carrier as soon as its buffer is depleted, based on sending a MAC Control Element (CE) to the UE 12, and the primary RLC entity 40 allocates a zero share of the user data for the UE 12 to the affected connection 20.

Figures 6A, 6B:
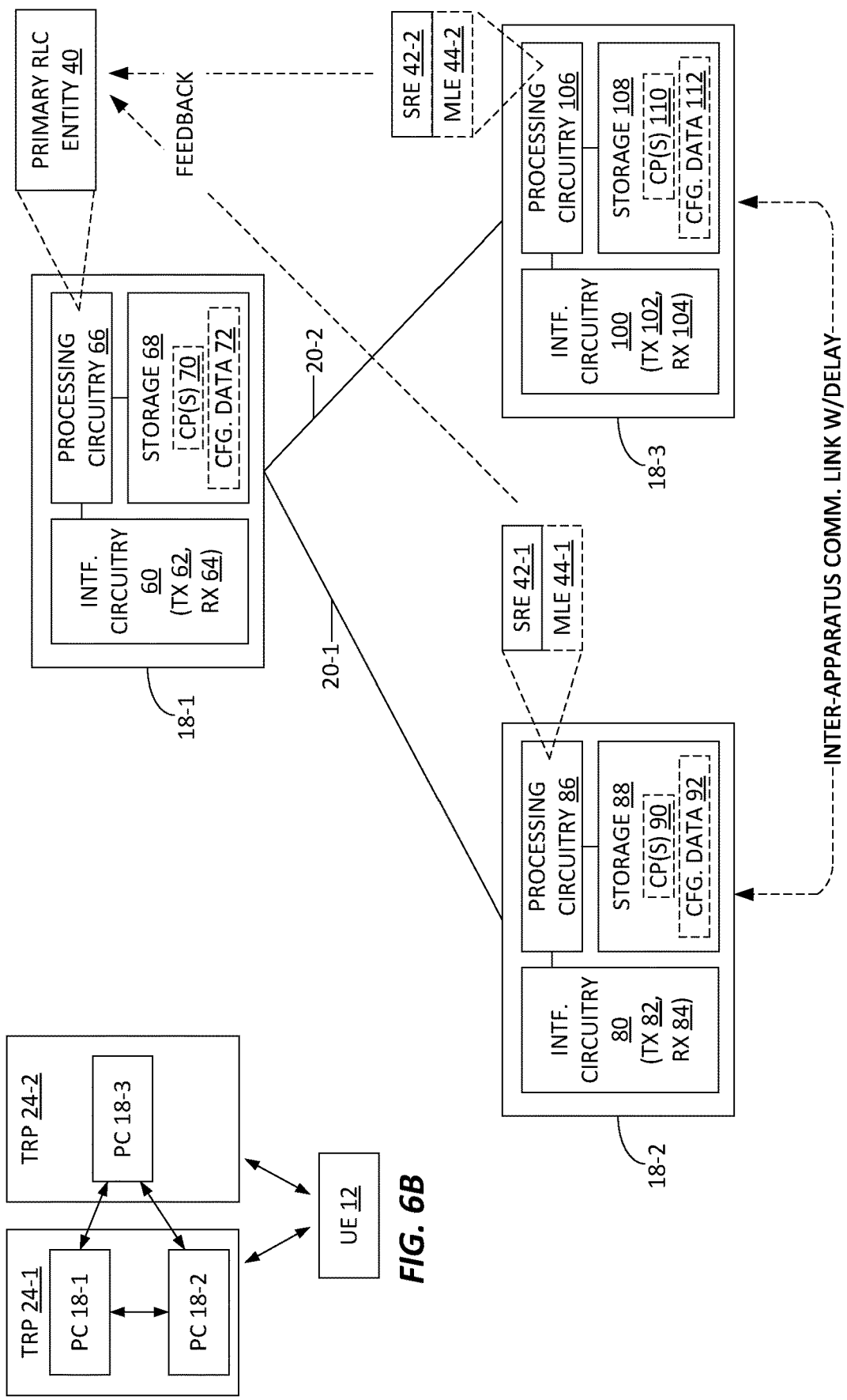
FIGS. 6A and 6B are block diagrams of example embodiments of processing apparatuses for implementation of RLC and related entities in a distributed or virtualized processing environment.

FIG. 6A depicts one example arrangement of the one or more processing apparatuses 18 introduced in FIG. 2. In the depicted implementation, a first processing apparatus 18-1 implements the primary RLC entity 40, a separate, second processing apparatus 18-2 implements a first secondary RLC entity (SRE) 42-1, and a separate, third processing apparatus 18-3 implements a second secondary RLC entity (SRE) 42-2. Referring back to the example context of FIG. 2, the primary RLC entity 40 decides respective shares of incoming RLC SDUs to be provided to the secondary RLC entities 42-1 and 42-2, while the secondary RLC entity 42-1 provides RLC processing and control for the connection 20-1 and its included radio link 22-1, and the secondary RLC entity 42-2 does the same for the connection 20-2 and its included radio link 22-2.

A processing apparatus 18 that is separate, i.e., distinct, from another processing apparatus 18 means that there are one or more input/output interfaces between them. As an example, two processing apparatuses 18 may be implemented using common processing circuitry, e.g., the same microprocessor core, or the same Central Processing Unit (CPU) and supporting circuitry. In such cases, the two processing apparatuses 18 would be considered co-located, or as not being separate. Conversely, in a case where one processing apparatus 18 is implemented in one computer server or in one set of processing circuitry and another processing apparatus 18 is implemented on another computer server or in another set of processing circuitry, the two apparatuses 18 would be considered as being separate.

In a case involving the use of virtualized BaseBand Units (vBBUs), such as where a portion of the radio protocol stack(s) used for communicating with a UE 12 through two or more TRPs 24 is implemented remotely from the TRPs 24, it would not be surprising for different parts of the stack(s) to be instantiated in separate processing circuitry—e.g., in separate servers. For example, the processing apparatus 18-2 may be realized on one server or in one set of processing circuitry, while the processing apparatus 18-3 is realized in a different server or set of processing circuitry, introducing a delay in the signaling going between them. The processing apparatus 18-1 may be instantiated with one of the processing apparatuses 18-2 or 18-3 or may be separate from both of them. (Additional processing apparatuses 18 implementing additional secondary RLC entities 42 would be involved, if there were more than two connections 20 involved.)

Broadly, the techniques disclosed herein overcome long backhaul delays, e.g., between the MLEs 44 associated with different connections 20. For example, depending on where the processing apparatuses 18-2 and 18-3 reside, they may or may not implement the associated MAC-layer processing. For example, again in the context of FIG. 2, the TRP 24-1 may include the apparatus 18-2, in which case the processing apparatus 18-2 may also implement the MAC-layer processing for the radio link 22-1, e.g., via the MLE 44-1, because the radio link 22-1 is in that case "local" to the processing apparatus 18-2. The same may hold for the processing apparatus 18-3—i.e., it may implement the MLE 44-2 for MAC-layer processing with respect to the radio link 22-2, in cases where the TRP 24-2 includes the processing apparatus 18-3. In fact, one of the TRPs 24 may include the processing apparatus 18-1 and one of the other processing apparatuses 18-2 or 18-3, with the other TPR 24 then including the remaining one of the processing apparatus 18-2 or 18-3.

FIG. 6B illustrates the foregoing scenario, where a TRP 24-1 includes the processing apparatus 18-1 and the processing apparatus 18-2, and where a TRP 24-2 includes the processing apparatus 18-3. In a scenario where the two TRPs 24-1 and 24-2 provide dual connectivity to a UE 12, the TRP 24-1 can be understood as providing the sharing-determination function performed by the primary RLC entity 40, with the TRP 24-1 further providing the RLC processing control represented by the secondary RLC entity 42-1, for its share of the RLC SDUs, and with the TRP 24-2 further providing the RLC processing and control represented by the secondary entity 42-2, for its share of the RLC SDUs.

More broadly, however, with respect to FIG. 6A, it should be appreciated that the term "processing apparatus" as used in the context of FIGS. 6A and 6B and throughout this disclosure denotes processing circuitry configured to carry out the ascribed functions. Thus, all of the processing apparatuses 18-1, 18-2, and 18-3 could be implemented within the same processing circuitry or within an associated pool of processing circuitry, such as in one or more servers or blades in a cloud-computing or data-center environment, such as represented by the remote computing system(s) 32 shown in FIG. 2.

However, an advantageous feature of the contemplated RLC flow control is accommodating signaling delays between the processing circuitry performing RLC processing and control and/or MAC processing and control for one connection 20 versus one or more other connections 20 that are being used to serve a UE 12. Put another way, the contemplated RLC flow control advantageously relaxes requirements on the backhaul connections that interconnect the MLEs 44 and provide connectivity between the MLEs 44 and the secondary RLC entities 42 that are not co-located with the primary RLC entity 40.

For example, as described above, in the context of FIG. 6A, for example, there may be delays in the feedback path from the processing apparatuses 18-2 and 18-3 to the processing apparatus 18-1, meaning that feedback from the secondary RLC entities 42-1 and 42-2 (and/or the MLEs 44-1 and 44-2). Additionally, or alternatively, in a case where the underlying processing circuitry used to implement the processing apparatus 18-2 is separate from the processing circuitry used to implement the processing apparatus 18-3, there may be delays in exchanging critical HARQ signaling between the involved MLEs 44-1 and 44-2. Rather than requiring large amounts of low-level feedback to flow back to the primary RLC entity 40, which may tax the involved communication interfaces, the primary RLC entity 40 uses a scheduling or control interval that accounts for such delays, and may receive feedback that is consolidated or averaged over such intervals. The feedback intervals may be defined according to the RLC specifications set out in 3GPP TS 38.322 or 36.322, for example, and may be configured by upper layers, see 3GPP TS 38.331 or 36.331, for example. The configuration provided by the network 10 provides instructions on how and when feedback should be sent and is allowed to be sent.

Example details for implementation of the processing apparatuses 18-1, 18-2, and 18-3 also appear in FIG. 6A, where the processing apparatus 18-1 is implemented via interface circuitry 60, including transmitter circuitry 62 and receiver circuitry 64, for exchanging signaling. The interface circuitry 60 may be computer interface circuitry, such as low-level bus interface circuitry. The processing apparatus 18-1 further includes processing circuitry 66 that implements or otherwise instantiates the logical processing operations collectively represented by the primary RLC entity 40.

Further, the processing apparatus 18-1 includes or is associated with storage 68, such as used to hold one or more computer programs 70 and/or configuration data 72 used in carrying out flow control. In at least one example, the processing circuitry 66 comprises one or more microprocessors or CPUs or other digital processing circuitry that are configured to implement the functionality ascribed to the primary RLC entity, based on the execution of computer program instructions comprised in the one or more computer programs 70 that are held in the storage 68. In that regard, the storage 68 comprises one or more types of computer-readable media, providing one or both of volatile and non-volatile storage of the computer program(s) 70 and the configuration data 72. Examples of the storage 68 include DRAM, SRAM, FLASH memory, EEPROM, or hard-drive storage, or any mix thereof. Here, the word "storage" does not necessarily connote permanent or unchanging storage but does denote "non-transitory" storage of at least some persistence.

The same qualifications and possibilities apply with respect to the processing apparatus 18-2, which, in this example, implements the secondary RLC entity 42-1. The processing apparatus 18-2 includes interface circuitry 80, including transmitter circuitry 82 and receiver circuitry 84, processing circuitry 86, and storage 88, e.g., for storing one or more computer programs 90 and any associated configuration data 92, for implementation of the secondary RLC entity 44-1 and, in at least some embodiments or contexts, the associated MLE 44-1. Likewise, the same qualifications and possibilities apply with respect to the processing apparatus 18-3, which, in this example, implements the secondary RLC entity 42-2. The processing apparatus 18-3 includes interface circuitry 100, including transmitter circuitry 102 and receiver circuitry 104, processing circuitry 106, and storage 108, e.g., for storing one or more computer programs 110 and any associated configuration data 112, for implementation of the secondary RLC entity 42-2 and, in at least some embodiments or contexts, the associated MILE 44-2.

With the above example details in mind, the processing apparatus 18-1 in FIG. 6A or 6B includes interface circuitry 60 configured to receive RLC Service Data Units (SDUs) incoming from a PDCP entity operating at a PDCP protocol layer in a wireless communication network 10, with the RLC SDUs carrying user traffic for a UE 12.

The processing apparatus 18-1 further includes processing circuitry 66 operatively associated with the interface circuitry 60 and configured to implement a primary RLC entity 40 operating at a split RLC protocol layer 52 in the network 10. The primary RLC entity 40 is configured to perform flow control for the RLC SDUs. To perform such flow control, the processing circuitry 66 operating as the primary RLC entity 40 is configured to provide respective shares of user data for a UE 12 to two or more DL connections 20 that communicatively couple the network 10 to the UE 12. Each DL connection includes one or more radio links 22 and has an associated secondary RLC entity 42 that provides segmentation processing for RLC PDU transmissions on the radio link(s) 22 included in the connection 20.

In support of the share determinations, the processing circuitry 66 is configured to dynamically determine the respective shares of the user data in dependence on feedback received at the primary RLC entity 40 for the two or more DL connections 20. The feedback relates to throughputs of the two or more DL connections 20. By "relating" to the throughput, the feedback may directly indicate the respective throughputs on the connections 20, or it may comprise one or more parameters that influence or depend on throughput, such as instantaneous or average data rates, instantaneous or average signal quality, etc.

In at least one embodiment of the processing apparatus 18-1, to dynamically determine the respective shares of the user data, the processing circuitry 66 is configured to determine respective throughputs of the two or more DL connections from the feedback, and determine the respective shares as weighted shares having respective weightings determined in dependence on the respective throughputs. For example, with two connections 20-1 and 20-2, the processing circuitry 66 assigns a higher weighting to the connection 20 having the higher throughput on a relative basis. The weighting may be proportional to the throughput differences, such as a two-thirds share of the incoming user data going to the connection 20-1 in a case where its throughput is calculated or deemed to be two-thirds better than the throughput of the connection 20-2. Other schemes are possible, such as where there are predefined tables of weightings for two-way splits, three-way splits, etc., and where the processing circuitry 66 uses the differences in relative throughput (or a quantized version thereof) to index into the table for the choice of connection weights to use.

Further, in at least one embodiment, or in an example operating scenario, the flow control uses an RLC Acknowledged Mode (RLC-AM), in which the UE 12 provides return indications of correctly-received RLC SDUs and missing RLC SDUs, as regards the RLC SDUs transmitted to the UE 12 via the two or more connections 20. Correspondingly, the feedback received at the primary RLC entity 40 comprises RLC-AM feedback comprising or derived from the return indications from the UE 12. The processing circuitry 66 in such embodiments or in such operating scenarios is configured to maintain tracking information indicating which particular RLC SDUs are provided to each DL connection 20. That is, regardless of whether the primary RLC entity 40 provides respective shares of the incoming user data for a UE 12 to the connections 20 being used to serve that UE 12 in the form of RLC SDUs or in the form of RLC PDUs, the primary RLC entity 40 may track the sequence numbers associated with the share of the user data that is provided to each connection 20.

If the primary RLC entity 40 provides RLC PDUs to the secondary RLC entities 42, it knows the PDU SNs directly. If the primary RLC entity 40 provides RLC SDUs to the secondary RLC entities 42, it may receive SN information from the secondary RLC entities 42, for tracking purposes. As one example where the primary RLC entity 40 provides RLC SDUs to the respective secondary RLC entities 42, in a 5G NR case, the RLC SDUs correspond to RLC PDUs.

In any case, SN tracking allows the processing circuitry 66 to associate a lost RLC SDU or PDU with the corresponding connection 20, and the processing circuitry 66 thus determines the respective throughputs of the two or more DL connections 20 by reconciling the RLC-AM feedback with the tracking information. In related details, for control by the primary RLC entity 40 of retransmission of a given RLC SDU indicated by the UE 12 as missing, the processing circuitry 66 is configured to control the retransmission to occur on the same DL connection 20 used for an unsuccessful transmission of the given RLC SDU, or cancel the given RLC SDU with respect to the DL connection 20 that was used for the unsuccessful transmission of the given RLC SDU, for retransmission of the given RLC SDU on another one of the two or more DL connections 20.

In another example embodiment, or under another example operating scenario, the flow control uses an RLC Unacknowledged Mode (RLC-UM), in which the UE 12 does not return indications of correctly-received RLC SDUs and missing RLC SDUs, as regards the RLC SDUs transmitted to the UE 12 via the two or more DL connections 20. As noted, each of the two or more DL connections 20 is associated with one or more MLEs 44 operating at a MAC protocol layer in the network 10. Each MILE 44 provides MAC-layer processing for one or more of the one or more radio links 22 included in the DL connection 20. Correspondingly, the feedback received at the primary RLC entity 40 comprises MAC-layer retransmission feedback originating from the MLEs 44 and is received on a per radio link basis, although it may not be received directly from each MILE 44. The processing circuitry 66 is configured to use the MAC-layer retransmission feedback to determine the respective throughputs for the two or more DL connections 20 and compare the respective throughputs to dynamically determine the respective shares of the user data provided to the two or more DL connections 20. "Determining" throughputs may involve calculating throughput or making a rough estimate of throughput, and may be done on absolute scale or on a relative scale, e.g., such as referenced to or normalized with the connection 20 having the highest nominal throughput according to known configuration information, or the highest achieved throughput according to tracked performance.

In at least one embodiment, or under at least one example operating scenario, the radio links 22 included in the two or more DL connections 20 correspond to respective DL CCs in a CA configuration being used to serve the UE 12. Here, each DL connection 20 includes at least one of the DL CCs included in the CA configuration, with each DL CC representing a radio link 22.

Regarding the feedback used to make the per-connection share decisions, the processing circuitry 66 in one or more embodiments is configured to determine the respective shares based on ranking the two or more DL connections 20 according to the feedback received at the primary RLC entity 40. Here, the feedback indicates at least one of: RLC-layer retransmissions on the respective DL connections 20; MAC layer retransmissions on the respective radio links 22; transport block sizes being used on the respective radio links 22, for transmitting to the UE 12; and signal qualities of the respective radio links 22, with respect to the UE 12.

Upon initialization or restarting of the flow control by the primary RLC entity 40, there may be no feedback available for the primary RLC entity 40. Thus, in at least one embodiment, the processing circuitry 66 is configured to determine the respective shares initially, based on comparing respective total bandwidth allocations associated with two or more DL connections 20. Such operations are done in advance of receiving "live" feedback, for example. For example, the primary RLC entity 40 receives messages or other signaling indicating the type(s) of radio links 22 associated with each connection 20, or otherwise receives information indicating nominal bandwidths, e.g., expressed in terms of each involved radio link 22 or expressed in terms of overall or aggregated bandwidth per connection.

Other schemes may be used, such as where the primary RLC entity 40 merely receives flags or other indicators that relate to the expected or nominal throughput of each connection. As another alternative, the primary RLC entity 40 may be configured to use default information—e.g., equal weightings-before live feedback becomes available, or at least do so in the absence of receiving initialization information.

As noted, accounting for inter-entity signaling delays is one of the advantages of the flow control performed at the RLC layer by the primary RLC entity 40, and as supported by the secondary RLC entities 42. That is, each of the two or more DL connections 20 is associated with one or more MLEs 44 operating at a MAC protocol layer in the network 10, with each MLE 44 providing MAC-layer processing for one or more of the one or more radio links 22 included in the DL connection 20. In cases where one or more of the MLE(s) 44 for one DL connection 20 are implemented separately from one or more of the MLE(s) 44 for at least one other DL connection, there generally are signaling delays that affect the exchange of HARQ information between the respective MLEs 44. Correspondingly, the processing circuitry 66 operating as the primary RLC entity 40 is configured to use a control interval for dynamically determining the respective shares of user data for the UE 12 that are provided to each DL connection 20, where the control interval accounts for the delay. In one such example case, the delay in question corresponds to inter-apparatus communication links between separate processing apparatuses 18 that are used to implement the MLEs 44 for the respective connections 20.

Figure 7:
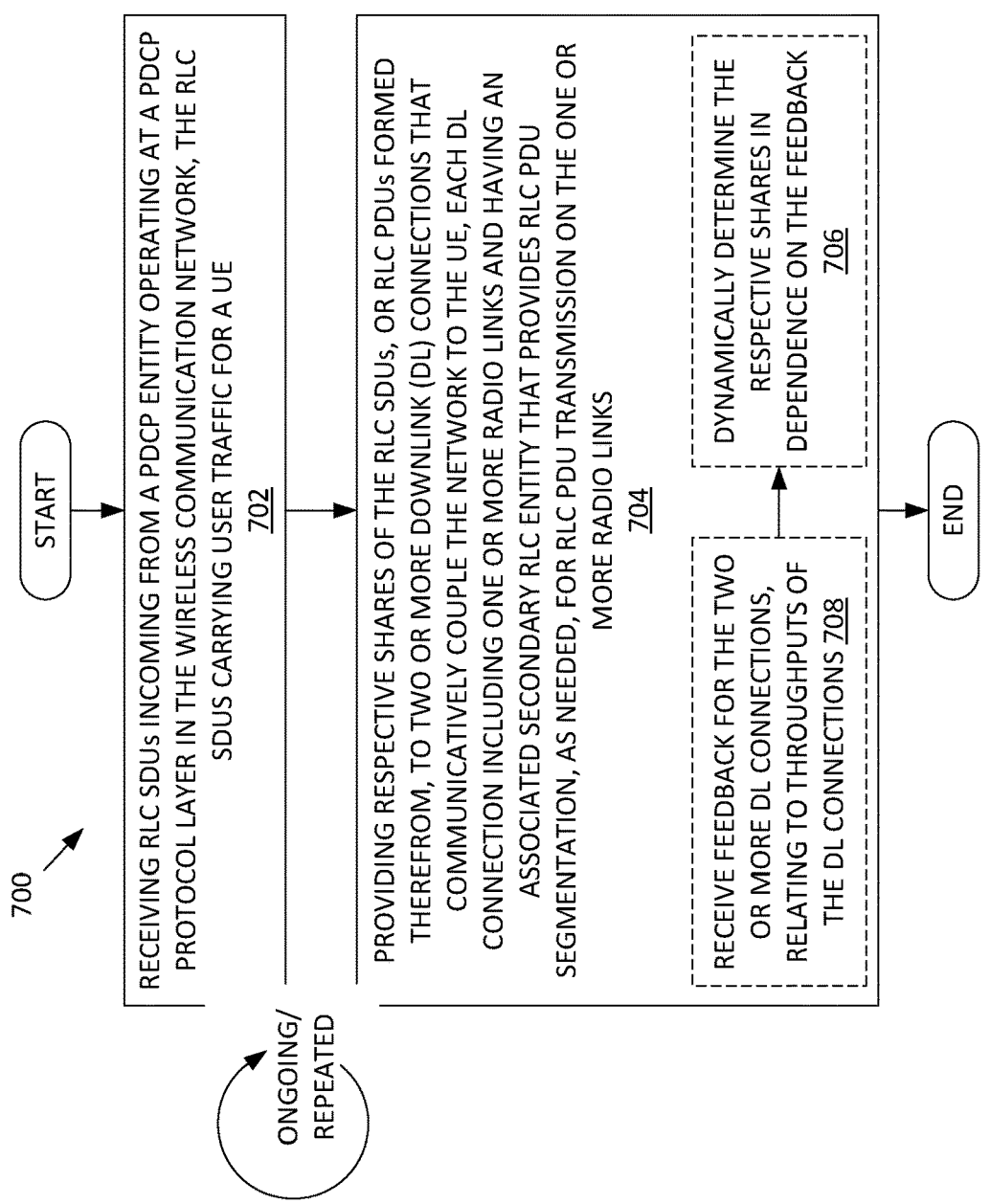
FIG. 7 is a logic flow diagram of one example of a method of RLC flow control, such as may be performed by the primary RLC entity depicted in any of FIGS. 4-6.

FIG. 7 illustrates a method 700, as performed by a primary RLC entity 40, according to one or more embodiments. The method 700 may be performed as part of or along with other processing and it may be carried out in parallel for multiple UEs 12 being served in multi-connectivity. Further, as indicated, the illustrated processing operations may be performed on an ongoing or repeated basis, during the delivery of user traffic to a UE 12. While the processing apparatus 18-1 depicted in FIG. 6A provides an example illustration of a circuitry arrangement suited for implementation of the primary RLC entity 40, the method 700 may be performed using other arrangements.

The method 700 includes receiving (Block 702) RLC SDUs incoming from a PDCP entity operating at a PDCP protocol layer in the network 10, with the RLC SDUs carrying user traffic for a UE 12. Further, the method 700 includes providing (Block 704) respective shares of the RLC SDUs, or RLC PDUs formed therefrom, to two or more DL connections 20 that communicatively couple the network 10 to the UE 12.

Each DL connection 20 includes one or more radio links 22 and has an associated secondary RLC entity 42 that provides segmentation processing, as needed, for the RLC PDUs transmitted on the radio link(s) 22 included in the connection 20. Correspondingly, the method 700 includes the primary RLC entity 40 dynamically determining (Block 706) the respective shares, in dependence on feedback received (Block 708) at the primary RLC entity 40 for the two or more DL connections 20.

The feedback relates to throughputs of the two or more DL connections 20 and, in an example, dynamically determining the respective shares of the RLC SDUs comprises determining respective throughputs of the two or more DL connections 20 from the feedback, and determining the respective shares as weighted shares having respective weightings determined in dependence on the respective throughputs. For example, in at least one embodiment, the feedback indicates at least one of: RLC-layer retransmissions on the respective DL connections 20; MAC layer retransmissions on the respective radio links 22; transport block sizes being used on the respective radio links 22, for transmitting to the UE 12; and signal qualities of the respective radio links 22, with respect to the UE 12. Further, the method 700 may include, in advance of the feedback becoming available as a consequence of carrying out the method of flow control, the primary RLC entity 40 initially determining the respective shares, based on comparing respective total bandwidth allocations associated with two or more DL connections 20.

In at least one embodiment or in at least one operating scenario, the radio links 22 included in the two or more DL connections 20 correspond to respective DL CCs in a CA configuration being used to serve the UE 12. Each DL connection 20 in this context includes at least one of the DL CCs included in the CA configuration.

In an example where the method 700 involves the use the RLC-AM, the feedback received at the primary RLC entity 40 comprises RLC-AM feedback comprising or derived from the return indications from the UE 12. Correspondingly, the method 700 includes the primary RLC entity 40 maintaining tracking information indicating which particular RLC SDUs are provided to each DL connection 20 and determining the respective throughputs of the two or more DL connections 20 by reconciling the RLC-AM feedback with the tracking information.

The method 700 may further include controlling retransmission of a given RLC SDU indicated by the UE 12 as missing (i.e., the missing RLC SDU was at least partly contained in an RLC PDU reported as missing by the UE 12). The retransmission control comprises controlling the retransmission to occur on the same DL connection 20 used for an unsuccessful transmission of the given RLC SDU, or by canceling the given RLC SDU with respect to the DL connection 20 that was used for the unsuccessful transmission of the given RLC SDU, for retransmission of the given RLC SDU on another one of the two or more DL connections 20.

In an example where the method 700 involves the use of the RLC-UM, the feedback received at the primary RLC entity 40 comprises MAC-layer retransmission feedback originating from the MLEs 44 associated with the included radio links 22 and is received on a per radio link basis. The primary RLC entity 40 uses the MAC-layer retransmission feedback to determine the respective throughputs for the two or more DL connections 20 and compares the respective throughputs to dynamically determine the respective shares provided to the two or more DL connections 20.

Further in carrying out the method 700, in one or more embodiments of the method 700, the control interval used by the primary RLC entity 40 for dynamically determining the respective shares accounts for a delay, such as a delay that accounts for the delay in exchanging MAC-related signaling between the MLEs 44 associated with different ones of the connections 20 being used for multi-connectivity service with the UE 12. For example, the MLE(s) 44 associated with each DL connection 20 are implemented in a processing apparatus 18 that is separate from that used to implement the MLE(s) 44 associated with the other ones of the two or more DL connections 20, and the delay accounted for in the control interval corresponds to inter-apparatus communication links between the separate processing apparatuses 18.

When portions of the RAN(s) 16 depicted in FIG. 2 are virtualized and key protocol-layer processing entities are instantiated in separate processing apparatuses 18, the ability of the primary RLC entity 40 to account for inter-entity delays yields significant advantages, as noted earlier herein. For example, in cooperation with involved secondary RLC entities 42, operation of the primary RLC entity 40 eliminates or at least reduces the need for tight synchronization between the processing apparatuses 18 used to implement protocol processing for one connection 20 versus other ones of the two or more connections 20 being used for multi-connectivity service with a UE 12. Additionally, splitting the RLC layer 52 as indicated herein, with RLC SDU allocations being handled for the connections 20 at one level, and with RLC processing and control being handled at a lower level on a per connection basis, eliminates or reduces the amount of real time or near real time feedback that must flow back to the primary RLC entity 40 from the involved secondary RLC entities 42 and/or involved MLEs 44.

These advantages are accentuated in a virtualized RAN (vRAN) scenario, where portions of the RAN(s) 16 of the network 10 are virtualized using COTS hardware in a data center environment, such as where BBUs are virtualized and communicatively coupled to RRUs anchoring the radio links 22. See FIG. 8, for example, depicting a set 800 of processing units or modules 802, 804, 806, and 808 that provide the functionality described herein for a primary RLC entity 40. The set 800 of processing modules 802, 804, 806, and 808 are realized, for example, based on the execution of computer program instructions via one or more CPUs or other processing circuitry, such as depicted in FIG. 6A for the processing apparatus 18-1. Such instantiation may, of course, include realization in virtualized processing circuitry in a remote computing system 32, although virtualized implementations also involve underlying processing circuitry.

The depicted receiving module 802 is configured to receive RLC Service Data Units (SDUs) incoming from a PDCP entity operating at a PDCP protocol layer in a wireless communication network 10, where the RLC SDUs carry user traffic, also referred to as user data, for a UE 12 being served via multiple connections 20. The RLC SDUs may be received via a data bus or via a computer network interface, for example.

A controlling module 804 includes a providing module 808 that is configured to provide respective shares of the RLC SDUs, or RLC PDUs formed therefrom, to two or more DL connections 20 that communicatively couple the network to the UE 12. Each DL connection 20 includes one or more radio links 22 and has an associated secondary RLC entity 42 that provides RLC PDU segmentation, as needed, for RLC PDU transmissions on the radio links 22 that are included in the connection 20.

A determining module 806 is configured to dynamically determine the respective shares in dependence on feedback received at the primary RLC entity 40 for the two or more DL connections 20. The feedback relates to throughputs of the two or more DL connections 20.

Figure 8:
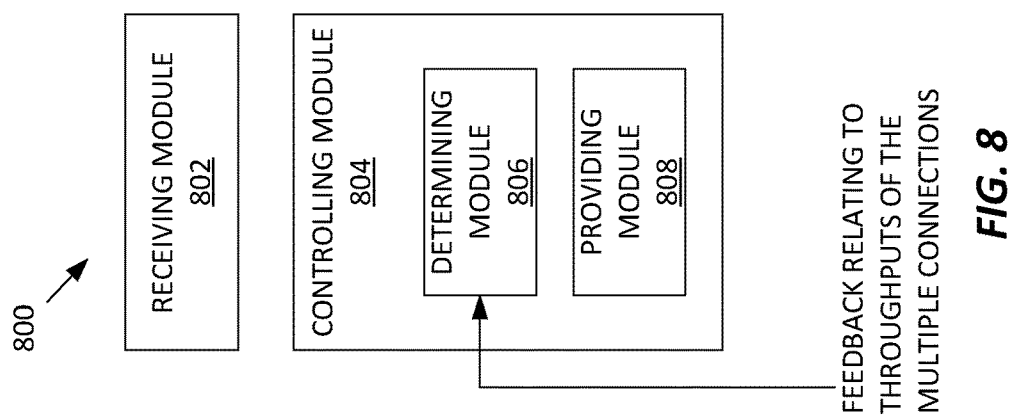
FIG. 8 is a block diagram of another embodiment of a primary RLC flow control entity, for RLC flow control across multiple connections with a UE.

Whether implemented in the modular example of FIG. 8, one or more embodiments involve the implementation of the primary RLC entity 40 and the secondary RLC entity 42 and associated MLEs 44 for at least one connection 20 in a vRAN deployment. In one such example, vBBU multiplexing dynamically allocates baseband resources to respective RRUs, thereby reducing BBU capacity requirements. Operationally, the multiplexing (sharing) of BBU processing resources among multiple RRUs allows the network operator to scale capacity dynamically according to network needs, such as increasing capacity during peak busy times or scaling capacity down during quiet times.

These operations can be understood as "moving" the processing capacity to where it is needed in the network 10, in relation to the density of UEs 12 and their movements within and across different cells or service areas of the network 10. Similarly, CA provides a form of load balancing between the different CCs. CA also brings the added benefit of increasing the bandwidth allocation available for a given UE.

Generally, it cannot be guaranteed that all CCs or, more broadly, radio links 22 that can be used for multi-connectivity to a given UE 12 will be allocated to a single vBBU. As such, the RLC-layer splitting and the attendant flow control disclosed herein offer distinct advantages in such cases, because the flow control relaxes the requirements on the interconnections (backhauls) between the involved protocol entities (MAC layer and RLC layer).

For example, there may be key items of information that must be exchanged between the MLEs 44 serving the radio links 22 included in a multi-connectivity scenario, with these exchanges affected by inter-entity signaling delays in the vRAN environment. Further, the "schedulers" running for the involved radio links 22, which may correspond to individual cells, beams, or other geographically-related service areas, may need to wait for the cooperating cells to confirm resource allocations.

Broadly, use of the primary/secondary RLC entities 40/42 described herein provides, among other things, a reduction in the interdependencies between the CCs (radio links 22) used in a CA or other multi-connectivity configuration, and reduces the level or extent of synchronization required between them. The disclosed techniques provide for aggregation flexibility regarding multiple radio links 22, by making the aggregation substantially independent of the underlying circuitry arrangements used to virtualize BBUs, or, more generally, by mitigating the problems that arise when RLC and/or MAC protocol entities associated with the radio links are instantiated in separate circuitry with attendant I/O bandwidth limitations between the entities. And, as noted, although examples herein use the DL context, the disclosed techniques also apply to the UL.

As an example of entity inter-dependencies, consider the HARQ processing in a CA context, consider that a given TRP 24 may provide one of two or more DL CCs being used to serve a UE in a CA configuration, while one or more other TRPs 24 provide the other DL CCs. However, the UE 12 may multiplex HARQ feedback for all of the DL CCs onto a single UL CC. The MLE 44 associated with that UL CC must then demultiplex the HARQ feedback and distribute it to the MLEs 44 responsible for the other DL CCs. In a vBBU context with each of the TRPs 24 having a separately instantiated vBBU, any I/O bottlenecks between the vBBUs affects the exchange of the demultiplexed HARQ feedback. Further, in a CA scenario, the disclosed split RLC layer 52 alleviates the data allocation delays that would otherwise arise with requests for RLC PDUs from the Secondary Cells (SCells) being tied to the completion of scheduled data transmissions for data already buffered for transmission in the Primary (PCell).

As such, absent the techniques disclosed herein, there are potentially significant delay "costs" associated with aggregating a CC handled by a separate vBBU. Correspondingly, there is an optional threshold for activation of a CC, which also may be referred to as a Secondary Cell or SCell in a CA configuration having a Primary Cell or PCell and one or more SCells. Once the threshold is exceeded for a given SCell and an initial split of the RLC SDUs buffered by the primary RLC entity 40 is performed, e.g., based on the channel quality, rank indication and bandwidth, the split buffer is processed at the RLC layer, as the PDUs are not segmented, i.e. SI=0.

Once a given CC is activated and the corresponding RLC PDUs are transferred to the collaborating vBBU, which performs corresponding scheduling MAC-layer operations. If an RLC PDU needs to be split, a function is called to rebuild the RLC header, which can be readily done in NR-based implementations, because in NR all segments have the same sequence number. The involved secondary RLC entity 42 may be configured to carry out such rebuilding.

To minimize the need of data segment reordering in higher layers at a receiver, the sender should transmit data in a way that minimizes reordering. The flow control contemplated herein, for example, splits the stream of user data from a primary vBBU associated with a primary radio link 22, to each vBBU handling an associated secondary radio links 22. The splitting depends on, for example, RLC Buffer status, RLC status PDUs, and HARQ feedback. The flow control maintains the fill level of the data buffer in each vBBU at a level that allows full utilization of available radio resources and at the same time allows adaptations for changing radio conditions on the respective radio links 22. That is, in a DL example, a primary RLC entity 40 operating in the primary vBBU dynamically decides the shares of RLC SDUs divided among the primary vBBU and the involved secondary vBBUs.

Once a data buffer in a collaborating vBBU handing an SCell in a CA scenario has been empty for some defined time T, the SCell is deactivated. For radio optimization, the deactivation may intentionally be triggered by the primary vBBU.

As a further example of operations with a split RLC layer 52, consider a case where there are two connections 20-1 and 20-2, where the connection 20-1 includes one radio link 22-1 and has associated with it a secondary RLC entity 42-1 and an MILE 44-1, where the connection 20-2 includes two radio links 22-2 and 22-3 and has associated with it a secondary RLC entity 42-2 and two MLEs 44-2 and 44-3 for the respective radio links 22-2 and 22-3. Further assume that the RLC-AM is in use such that the UE 12 sends indications of missing RLC SDUs and SDU segments and that the vBBU implementing the secondary RLC entity 42-1 and MLE 44-1 is separate from the vBBU implementing the secondary RLC entity 42-2 and the MLEs 44-2 and 44-3.

To allow the primary RLC entity 40 to derive feedback per connection 20, it needs to maintain a history of which RLC SDUs or PDUs it sends to each secondary RLC entity 42. The length of this history—e.g., number of "records"- depends on the number of RLC PDUs that is allowed to be outstanding at any given moment, which depends on the configuration of the Sequence Number (SN) length parameter. As an example, assume a 5G/NR operating scenario where an RLC SDU corresponds to an RLC PDU, and where the primary RLC entity 40 receives or tracks the following per-connection history regarding which RLC SDUs were provided to which connection 20: {connection 20-1: RLC SDU 1, 2, 4, 8, 9} and {connection 20-2, RLC SDU 3, 5, 6, 7}. Worth noting here, and with momentary reference to the example of FIG. 4B, in a case where the primary RLC entity 40 provides RLC SDUs to the respective secondary RLC entities 42, the primary RLC entity 40 also provides the corresponding SNs.

Now assume that the primary RLC entity 40 receives feedback indicating that RLC SDUs 2 and 4 are missing and that, aside from the two missing or lost RLC SDUs, the UE 12 has correctly received all other RLC SDUs, up to RLC SDU 8. Using T as the elapsed time since the last feedback cycle, and using the above per-connection-history records, the primary RLC entity 40 knows the acknowledged RLC SDU rate on the connection 20-1 is two RLC SDUs/T, while the acknowledged RLC SDU rate for the connection 20-2 is four RLC SDUs/T.

The primary RLC entity 40 updates its per connection scheduling weights for the connections 20-1 and 20-2 to two and four SDUs/T respectively. These scheduling weights then drive the subsequently splitting of incoming data (incoming RLC SDUs) across the two connections 20-1 and 20-2 and thus can be understood as dictating the share of user data allocated to the connection 20-1 versus the connection 20-2. With knowledge of T and the size of each RLC SDU, the primary RLC entity 40 may compute actual data rates for the respective connections 20 and use the calculated data rates to determine the share of user data allocated to each connection 20 during the current or next scheduling interval. And, as noted, the scheduling weights may be initialized to values corresponding to the absolute or relative bandwidths associated with each connection 20. For example, the total bandwidth allocation associated with the connection 20-1 may be taken as the sum of the bandwidths of the radio link(s) 22 included in the connection 20-1, and likewise calculated for the connection 20-2.

Further, in the RLC-AM, the sender is responsible for maintaining the transmitting window and ensuring that no outstanding RLC PDU lands outside the transmitting window when the window is advanced. Here, the "transmitting window" provides a span of RLC PDU Sequence Numbers (SN) that are allowed to be in flight between the sender and the receiver. Thus, the transmitting window is advanced, as RLC PDUs are acknowledged by the receiver. In an implementation as described above, either RLC retransmissions must be sent on the same connection used for the previous transmission of the RLC PDU or a mechanism to drop/cancel any previous transmission of the RLC PDU must be employed. The latter approach enables the primary RLC entity 40 to select a different connection 20 when retransmitting the RLC PDU.

Also as noted earlier herein, in the RL-UM, the receiver does not provide any explicit RLC feedback. However, existing HARQ information in the MAC layer can be used as feedback. For example, consider the same arrangement of connections 20 and radio links 22 described immediately above. Further, assume that RLC SDUs 1, 2, 4, 8, and 9 have been sent on the connection 20-1 and RLC SDUs 3, 5, 6, and 7 have been sent on the connection 20-2. Feedback coming to the primary RLC entity 40 is now received on a per radio link and MAC layer instance. Hence, the primary RLC entity 40 only needs to account for the amount of data sent onto each connection 20. The data rate per connection is calculated as data acknowledged (at the MAC layer) per interval T. The primary RLC entity 40 updates the scheduling weights accordingly, which results in a greater share of data being provided to the better-performing one of the two connections 20-1 and 20-2, which is the connection 20-2 in the above example.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of flow control performed by a primary Radio Link Control entity operating at an RLC protocol layer in a wireless communication network, the primary RLC entity implemented by a processing apparatus and the method comprising:

receiving RLC Service Data Units incoming from a Packet Data Convergence Protocol entity operating at a PDCP protocol layer in the wireless communication network, the RLC SDUs carrying user traffic for a User Equipment;

providing respective shares of the RLC SDUs, or RLC Protocol Data Units formed therefrom, to two or more Downlink connections that communicatively couple the wireless communication network to the UE, each DL connection including one or more radio links and having an associated secondary RLC entity that provides RLC PDU segmentation, as needed, for RLC PDU transmissions on the one or more radio links; and dynamically determining the respective shares in dependence on feedback received at the primary RLC entity for the two or more DL connections, the feedback relating to throughputs of the two or more DL connections.

2. The method of claim 1, wherein dynamically determining the respective shares comprises determining respective throughputs of the two or more DL connections from the feedback and determining the respective shares as weighted shares having respective weightings determined in dependence on the respective throughputs.

3. The method of claim 1, wherein the method of flow control uses an RLC Acknowledged Mode in which the UE provides return indications of correctly received RLC SDUs and missing RLC SDUs, as regards the respective RLC SDUs transmitted to the UE via the two or more connections, and wherein:
the feedback received at the primary RLC entity comprises RLC AM feedback comprising or derived from the return indications from the UE; and
the method includes the primary RLC entity 40 maintaining tracking information indicating which particular RLC SDUs are provided to each DL connection and determining the respective throughputs of the two or more DL connections by reconciling the RLC AM feedback with the tracking information.

4. The method of claim 3, wherein the primary RLC entity controls retransmission of a given RLC SDU indicated by the UE as missing, either by controlling the retransmission to occur on the same DL connection R used for an unsuccessful transmission of the given RLC SDU, or by canceling the given RLC SDU with respect to the DL connection that was used for the unsuccessful transmission of the given RLC SDU, for retransmission of the given RLC SDU on another one of the two or more DL connections.

5. The method of claim 1, wherein the method of flow control uses an RLC Unacknowledged Mode in which the UE does not return indications of correctly received RLC SDUs and missing RLC SDUs, as regards the respective RLC SDUs transmitted to the UE via the two or more DL connections, and wherein:
each of the two or more DL connections is associated with one or more Medium Access Control entities operating at a MAC protocol layer in the wireless communication network, each MAC entity providing MAC layer processing for one or more of the one or more radio links included in the DL connection;
the feedback received at the primary RLC entity comprises MAC layer retransmission feedback originating from the MAC entities and is received on a per radio link basis; and
the primary RLC entity uses the MAC layer retransmission feedback to determine the respective throughputs for the two or more DL connections and compares the respective throughputs to dynamically determine the respective shares provided to the two or more DL connections.

6. The method of claim 1, wherein the radio links included in the two or more DL connections correspond to respective DL Component Carriers in a Carrier Aggregation configuration being used to serve the UE, and wherein each DL connection includes at least one of the DL CCs included in the CA configuration.

7. The method of claim 1, wherein dynamically determining the respective shares comprises determining the respective shares based on ranking the two or more DL connections according to the feedback received at the primary RLC entity, the feedback indicating at least one of: RLC layer retransmissions on the respective DL connections; Medium Access Control layer retransmissions on the respective radio links; transport block sizes being used on the respective radio links for transmitting to the UE; and signal qualities of the respective radio links with respect to the UE.

8. The method of claim 1, further comprising, in advance of the feedback becoming available as a consequence of carrying out the method of flow control, initially determining the respective shares based on comparing respective total bandwidth allocations associated with two or more DL connections.

9. The method of claim 1, wherein:
each of the two or more DL connections is associated with one or more Medium Access Control entities operating at a MAC protocol layer in the wireless communication network, each MAC entity providing MAC layer processing for one or more of the one or more radio links included in the DL connection;
the one or more MAC entities associated with the respective DL connections exchange MAC related signaling that experiences delay; and
a control interval used by the primary RLC entity for dynamically determining the respective shares accounts for the delay.

10. The method of claim 9, wherein the MAC entity or entities associated with each DL connection are implemented in a processing apparatus that is separate from that used to implement the MAC entity or entities associated with the other ones of the two or more DL connections, and wherein the delay corresponds to inter apparatus communication links between the separate processing apparatuses.

11. The method of claim 1, wherein providing the respective shares of the RLC SDUs, or the RLC PDUs formed therefrom, comprises:
the primary RLC entity providing a respective share of the RLC SDUs to each connection; or
the primary RLC entity forming the RLC PDUs from the RLC SDUs and providing a respective share of the RLC PDUs to each connection.

12. A processing apparatus comprising:
interface circuitry configured to receive RLC Service Data Units incoming from a Packet Data Convergence Protocol entity operating at a PDCP protocol layer in a wireless communication network, the RLC SDUs carrying user traffic for a User Equipment; and
processing circuitry operatively associated with the interface circuitry and configured to implement a primary RLC entity operating at an RLC protocol layer in the wireless communication network 4, the primary RLC entity configured to perform flow control for the RLC SDUs and wherein, to perform the flow control, the processing circuitry operating as the primary RLC entity is configured to:
provide respective shares of the RLC SDUs, or RLC Protocol Data Units formed therefrom, to two or more Downlink connections that communicatively couple the wireless communication network to the UE, each DL connection f including one or more radio links and having an associated secondary RLC entity that provides RLC PDU segmentation, as needed, for RLC PDU transmissions on the one or more radio links; and
dynamically determine the respective shares in dependence on feedback received at the primary RLC entity for the two or more DL connections, the feedback relating to throughputs of the two or more DL connections.

13. The processing apparatus of claim 12, wherein, to dynamically determine the respective shares, the processing apparatus is configured to determine respective throughputs of the two or more DL connections from the feedback, and determine the respective shares as weighted shares having respective weightings determined in dependence on the respective throughputs.

14. The processing apparatus of claim 12, wherein the flow control uses an RLC Acknowledged Mode in which the UE provides return indications of correctly received RLC SDUs and missing RLC SDUs, as regards the respective RLC SDUs transmitted to the UE via the two or more DL connections, and wherein:

the feedback received at the primary RLC entity comprises RLC AM feedback comprising or derived from the return indications from the UE; and the processing circuitry is configured to maintain tracking information indicating which particular RLC SDUs are provided to each DL connection and determining the respective throughputs of the two or more DL connections by reconciling the RLC AM feedback with the tracking information.

15. The processing apparatus of claim 14, wherein, for control by the primary RLC entity of retransmission of a given RLC SDU indicated by the UE as missing, the processing circuitry is configured to control the retransmission to occur on the same DL connection used for an unsuccessful transmission of the given RLC SDU, or cancel the given RLC SDU with respect to the DL connection that was used for the unsuccessful transmission of the given RLC SDU, for retransmission of the given RLC SDU on another one of the two or more DL connections.

16. The processing apparatus of claim 12, wherein the flow control uses an RLC Unacknowledged Mode in which the UE does not return indications of correctly received RLC SDUs and missing RLC SDUs, as regards the respective RLC SDUs transmitted to the UE via the two or more DL connections, and wherein:

each of the two or more DL connections is associated with one or more Medium Access Control entities operating at a MAC protocol layer in the wireless communication network, each MAC entity providing MAC layer processing for one or more of the one or more radio links included in the DL connection;

the feedback received at the primary RLC entity comprises MAC layer retransmission feedback originating from the MAC entities and is received on a per radio link basis; and the processing circuitry is configured to use the MAC layer retransmission feedback to determine the respective throughputs for the two or more DL connections R and compare the respective throughputs to dynamically determine the respective shares provided to the two or more DL connections.

17. The processing apparatus of claim 12, wherein the radio links included in the two or more DL connections correspond to respective DL Component Carriers in a Carrier Aggregation configuration being used to serve the UE, and wherein each DL connection includes at least one of the DL CCs included in the CA configuration.

18. The processing apparatus claim 12, wherein, to dynamically determine the respective shares, the processing circuitry is configured to determine the respective shares based on ranking the two or more DL connections according to the feedback received at the primary RLC entity, the feedback indicating at least one of: RLC layer retransmissions on the respective DL connections; Medium Access Control layer retransmissions on the respective radio links; transport block sizes being used on the respective radio links for transmitting to the UE; and signal qualities of the respective radio links with respect to the UE.

19. The processing apparatus of claim 12, wherein, in advance of the feedback becoming available as a consequence of carrying out the flow control, the processing circuitry is configured to determine the respective shares initially, based on comparing respective total bandwidth allocations associated with two or more DL connections.

20. The processing apparatus of claim 12, wherein:

each of the two or more DL connections is associated with one or more Medium Access Control entities operating at a MAC protocol layer in the wireless communication network, each MAC entity providing MAC layer processing for one or more of the one or more radio links included in the DL connection;

the one or more MAC entities associated with the respective DL connections exchange MAC related signaling that experiences delay; and the processing circuitry is configured to use a control interval for dynamically determining the respective shares that accounts for the delay.

21. The processing apparatus of claim 20, wherein the MAC entity or entities associated with each DL connection are implemented in a processing apparatus that is separate from that used to implement the MAC entity or entities associated with the other ones of the two or more DL connections, and wherein the delay corresponds to inter apparatus communication links between the separate processing apparatuses.

22. The processing apparatus of claim 12, wherein, to provide the respective shares of the RLC SDUs, or the RLC PDUs formed therefrom, the processing circuitry operating as the primary RLC entity is configured to:

provide a respective share of the RLC SDUs to each connection; or form the RLC PDUs from the RLC SDUs and provide a respective share of the RLC PDUs to each connection.

* * * * *